United States Patent Office 3,030,411
Patented Apr. 17, 1962

---

3,030,411
METHOD FOR THE SEPARATION OF SULFURIC ACID FROM SULFURIC ACID-SULFONIC ACID MIXTURES
Leonard N. Leum, Media, and James E. Connor, Jr., Drexel Hill, Pa., assignors to The Atlantic Refining Company, Philadelphia, Pa., a corporation of Pennsylvania
No Drawing. Filed Sept. 21, 1959, Ser. No. 841,022
8 Claims. (Cl. 260—505)

This invention relates to a method for the separation of sulfuric acid from sulfonic acids by the use of an anion exchange resin and more particularly it relates to a method for the separation of sulfuric acid from alkylated aryl sulfonic acids wherein the alkyl group contains from 9 to 18 carbon atoms.

In recent years alkylated aryl sulfonic acids and their corresponding salts, the sulfonates, have been employed in increasingly large amounts, not only as household detergents but also as industrial detergents and wetting agents. In many instances a manufacturer prefers to buy the sulfonic acids and neutralize them to suit his own desires. One trend has been quite noticeable, namely, an increased demand for higher purity sulfonic acids from the standpoint of their sulfuric acid content and correlatively higher purity sulfonates from the standpoint of inorganic salt content. At least one reason for the increased demand for such higher purity materials may result from the fact that low inorganic salt content sulfonates are required for the emulsion polymerization of latices which are to be utilized in paint formulations since if inorganic salts are present, the paint will "bloom" or develop pinholes. In other emulsion polymerization uses it is critical, if there is an appreciable inorganic salt content in the sulfonate, that it be constant from batch to batch, which result with present methods of manufacture is almost impossible of achievement.

Finally, in those instances where the sulfonic acids and sulfonates are to be used in the compounding of detergents, the compounders prefer that the solids content of the material being shipped be as high as possible and that the solids be only "active" material. It has been found that in the absence of inorganic salts the aqueous solutions of sulfonates can be made much more concentrated and still retain their clarity, thus meeting this demand of the detergent compounders.

Although the sulfonation of alkylated aryl hydrocarbons has been known and practiced for many years no completely successful method has been found for successfully separating the spent sulfuric acid from the alkylated aryl sulfonic acids produced by the sulfonation reaction. The processes which have been practiced involve phase separation which separations are known to be inherently incomplete. In order to improve these processes successive extractions and settlings, batch neutralizations and extractions, and similar expedients have been tried. These methods were at most only partially successful in separating the sulfuric acid from the sulfonic acids.

A method now has been found, however, whereby sulfuric acid can be substantially completely separated from sulfonic acids by a highly efficient process and thereby making it possible to produce alkylated aryl sulfonates of exceedingly low inorganic salt content. This separation of sulfuric acid from alkylated aryl sulfonic acids is accomplished by contacting the sulfuric acid-sulfonic acid mixture with an anion exchange resin.

It is an object of this invention, therefore, to provide a method for separating sulfuric acid from sulfuric acid-sulfonic acid mixtures.

It is a further object of this invention to provide a method for separating sulfuric acid from sulfuric acid-alkylated aryl sulfonic acid mixtures.

It is a further object of this invention to provide a method for separating sulfuric acid from sulfuric acid-alkylated aryl sulfonic acid mixtures by the use of an anion exchange resin.

It is a further object of this invention to provide a method for producing substantially sulfuric acid-free alkylated aryl sulfonic acids.

It is a further object of this invention to provide a method for producing alkylated aryl sulfonates of low inorganic salt content from alkylated aryl sulfonic acids which have been contacted with an anion exchange resin to separate the sulfuric acid therefrom.

Further objects will be apparent from the description of the invention and the claims that follow.

In accordance with the process of the instant invention alkylated aryl sulfonic acids contained in a non-polar solvent and admixed with small amounts of spent sulfuric acid from the sulfonation reaction are contacted with an anion exchange resin which is in the hydroxyl cycle. As the sulfuric acid-sulfonic acid mixture is contacted with the resin, a portion of the resin is converted from the hydroxyl cycle to the sulfate cycle by ion exchange with the sulfuric acid. As additional quantities of the sulfuric acid-sulfonic acid mixture are contacted with the resin bed, additional resin is converted to the sulfate cycle while simultaneously that portion of the resin bed which has been converted to the sulfate cycle adsorbs sulfuric acid from the mixture. Thus, sulfuric acid is separated from the sulfuric acid-sulfonic acid mixture both by ion exchange and adsorption. Finally, after all of the resin has been converted to the sulfate cycle the process of separating sulfuric acid from the sulfonic acids is accomplished solely by adsorption of the sulfuric acid.

Additional quantities of sulfuric acid therefore may be separated from the sulfuric acid-sulfonic acid mixtures after the theoretical ion exchange capacity of the resin has been exhausted. Eventually the adsorptive capacity of the sulfate form of the anion exchange resin is reached and it becomes necessary to regenerate the resin before using it for further separation. Preferably, the treatment of the sulfuric acid-sulfonic acid mixture is discontinued before the entire adsorptive capacity of the sulfate form of the resin has been utilized in order to insure the effluent will not contain sulfuric acid.

The regeneration is accomplished simply by contacting the resin first with the non-polar solvent to remove any occluded sulfonic acids and thereafter with a polar solvent to remove the adsorbed sulfuric acid and finally contacting the resin with a dilute solution containing hydroxyl ions, for example, a dilute solution of sodium hydroxide, to convert the resin back to the hydroxyl cycle. The resin is thereafter washed and contacted successively with the polar solvent and non-polar solvent and is thereby rendered suitable for contacting additional quantities of the sulfuric acid-sulfonic acid mixture contained in the non-polar solvent.

Various types of anion exchange resins are available commercially and may be used in the process of the present invention. For example, the anion exchange resin sold under the designation of Amberlite IRA–400 has been found to be useful. This resin which is a quaternary, strong base type resin is sold in the chloride form having a particle size ranging between 0.35 and 0.45 mm. and is prepared by reacting a tertiary amine with a chloromethylated copolymer of styrene and divinylbenzene and is described in U.S. Patent No. 2,591,573. With respect to the Amberlite IRA–400 resin, the production of the copolymer is described in detail in the first full paragraph of page 84 of the book by Robert Kunin, entitled "Ion Exchange Resins," Second Edition, John Wiley & Sons, Inc., New York (1958). The chloromethylation of this copolymer and subsequent reaction with trimethyl amine is described in detail in the last full paragraph of page 88 and continued on page 97 of this book.

Another strongly basic anion exchange resin which may be utilized is sold under the designation Permutit S–1 anion exchange resin. This resin is sold in the chloride form and has a particle size ranging between 10 and 50 U.S. Standard Mesh. The cross-linked polystyrene is prepared by reacting a mixture of 90 parts by weight of styrene with 20 parts by weight of divinylbenzene in water containing approximately 1 percent benzoyl peroxide catalyst and 100 parts of the 1 percent stabilizer solution such as carboxymethyl cellulose under proper conditions of agitation at a temperature of 60° C. to 90° C. The mixture is stirred at a rate to disperse the styrene containing solution in the aqueous medium as droplets corresponding approximately to the size of the resin granules desired as product. The reaction period is approximately 24 hours with a gradual temperature increase within the range specified. The polymer beads are chloromethylated and subsequently reacted with trimethylamine in the manner referred to above to produce the anion exchange resin.

In addition to the strongly basic anion exchange resins weakly basic anion exchange resins also have been found to be quite suitable for the purpose of separating sulfuric acid from sulfonic acids in accordance with the method of this invention. The weakly basic anion exchange resins are prepared by reacting a primary or a secondary amine with the chloromethylated copolymer of styrene and divinylbenzene. A particularly useful resin results when dimethylamine is employed as set forth on page 97 of the aforementioned book by Kunin. The ion exchange capacity, the particle size, the ion form in which the resin is usually supplied, the maximum temperature which the resin can withstand and other pertinent information are supplied by the manufacturers of anion exchange resins and also may be found in standard text books on the subject of ion exchange.

The anion exchange resins as produced by manufacturers are generally in the form of granules having a particle size of from about 10 to about 50 mesh (U.S. Standard Sieve). It is preferable that the anion exchange resin be utilized in the form of a bed over which the mixture of sulfuric acid and sulfonic acid may be passed either in a downflow direction or in an upflow direction. If desired, batch-type treatments instead of continuous treatment may be utilized for treating limited quantities of sulfonic acids.

Anion exchange resins are frequently supplied by the manufacturers in the chloride form although a number of weakly basic anion exchange resins are supplied in the hydroxyl form. If the resin as received from the manufacturer is in other than the hydroxyl form the resin may be treated in the conventional manner with an approximately 5 percent sodium hydroxide solution in water to convert the resin to the hydroxyl cycle. After a water rinse the resin in the hydroxyl cycle is contacted with an aqueous methanol solution and then with a non-polar solvent such as hexane to produce a resin substantially free of water. Preferably, sufficient non-polar solvent to cover the resin bed is allowed to remain in contact with the bed. Following this treatment the mixture of sulfuric acid-sulfonic acid in a non-polar solvent such as hexane is passed over the anion exchange resin as has been described.

Sulfuric acid-sulfonic acid mixtures are generally rather viscous and accordingly it is preferably that they be diluted with a solvent to reduce their viscosity. It is a critical feature of this invention that the solvent be non-polar. When a non-polar solvent is employed, the sulfuric acid is separated from the sulfonic acids by ion exchange, when the resin is in the hydroxyl cycle thereby converting the resin into the sulfate form or cycle. The resin in the sulfate cycle adsorbs sulfuric acid from the sulfuric acid-sulfonic acid mixture, thus, until the resin is converted completely to the sulfate cycle, sulfuric acid is separated from the sulfuric acid-sulfonic acid mixture both by ion exchange and by adsorption. Finally after all of the resin is in the sulfate cycle, sulfuric acid is separated only by adsorption until the adsorptive capacity of the resin is reached, as shown by the appearance of sulfuric acid in the effluent from the anion exchange bed.

Subsequently, the resin is regenerated for re-use by desorbing the sulfuric acid from the resin with a polar solvent such as water, water-alcohol mixtures, water-dioxane mixtures, or similar polar solvents or successive combinations of such polar solvents and thereafter converting the resin into the hydroxyl form by treatment with a dilute solution of an alkali such as sodium hydroxide. Preferably following conversion of the resin to the hydroxyl cycle the resin is water washed and then washed with the polar solvent and finally washed with a non-polar solvent such as hexane as has been described to give a resin relatively free of water and ready for re-use.

Thus, if the sulfuric acid-sulfonic acid mixture is contained in a polar solvent it would be impossible to separate any sulfuric acid by adsorption when the resin is in the sulfate cycle since the polar solvent is a desorbent for the sulfuric acid. Moreover, it has been found also that although the resin in the hydroxyl cycle will react with sulfuric acid in the sulfuric acid-sulfonic acid mixture contained in a polar solvent, the resin will also take up quantities of sulfonic acids thereby materially reducing the yield of sulfonic acids obtained. Accordingly, therefore, it is not possible to employ a solution of sulfuric acid-sulfonic acids in a polar solvent in the process of this invention.

The preparation of alkylated aryl sulfonic acids and their corresponding sulfonates is well known and has been described both in the technical literature and in the patented art. In general, an aryl hydrocarbon such as benzene, toluene, xylene, naphthalene, or similar compound, is alkylated to produce the sulfonation charge material. The alkylation may be accomplished by reacting the aryl hydrocarbon with an alcohol or mixtures of alcohols containing from 9 to 18 carbon atoms in the presence of a suitable alkylation catalyst such as sulfuric acid or a Friedel–Crafts type catalyst. Preferably the aryl hydrocarbon is alkylated with a mono-olefin polymer or mixtures of such polymers containing from 9 to 18 carbon atoms employing a catalyst such as sulfuric acid, aluminum chloride, boron trifluoride, or the like.

The olefin polymer may be produced by any conventional means such as subjecting a low molecular weight olefin to polymerization conditions in the presence of a catalyst such as phosphoric acid impregnated on kieselguhr. Preferably propylene is polymerized in this manner and a fraction boiling in the range of about 240° F. to 430° F. comprising polymers containing from 9 to 15 carbon atoms with minor amounts of polymers containing up to 18 carbon atoms is reacted with the aryl hydrocarbon in the presence of an aluminum chloride catalyst at temperatures ranging between 100° F. and 180° F. After washing with dilute alkali and water, the alkylated hydrocarbon may be fractionated to produce the desired molecular weight range alkylated aryl hydrocarbons. The alkylated aryl hydrocarbons may be sulfonated by treatment with concentrated (98 percent to 100 percent) sulfuric acid or fuming sulfuric acid in accordance with well known conventional methods.

The sulfonation mixture usually contains some sulfur dioxide which may be removed by stripping with a stream of air or other inert gas. Since the sulfonation mixture is quite viscous, it is usually mixed with 3 to 10 volumes of a non-polar solvent for the sulfuric acid and sulfonic formed, the upper layer being the hexane solution of the alkyl benzene sulfonic acids and the lower layer the spent sulfuric acid. After settling and separating, the hexane layer was found to contain 19.1 percent by weight sulfonic acid and 1.6 percent by weight sulfuric acid. A portion of this hexane solution was passed through a 100 cc. bed of Permutit S–1 anion exchange resin in the hydroxyl cycle and which had been treated with several volumes, based on the volume of the resin, of an approximately 50 volume percent aqueous methanol solution followed by several volumes of hexane per volume of resin to remove the water from the resin. Approximately 4 to 6 liters of the hexane sulfuric acid-sulfonic acid solution was passed over the ion exchange bed and the point at which the sulfuric acid was no longer being removed was determined by analysis of the effluent. The resin then was washed with several volumes of hexane, several volumes of an approximately 50 volume percent aqueous methanol solution and several volumes of water following which the resin was regenerated to the hydroxyl cycle with a 5 percent aqueous solution of sodium hydroxide. Following the regeneration step the resin was washed with water, the 50 volume percent aqueous methanol solution and finally hexane so that it was prepared for re-use to contact additional hexane sulfuric acid-sulfonic solution. Thus a complete cycle constituted contacting the resin with the hexane sulfuric acid-sulfonic solution, hexane wash, aqueous methanol wash, water wash, caustic regeneration, water wash, aqueous methanol wash, and finally hexane wash. The foregoing cycle was repeated a total of five times.

The amount of sulfuric acid removed per cycle was found to be 5.5 pounds per gallon of resin. It was shown that this capacity was not decreasing since on the fifth cycle 5.7 pounds of sulfuric acid per gallon of resin were removed. The analysis of the effluent in the fifth cycle showed sulfuric acid content of 0.05 percent by weight, whereas the sulfonic acid content remained unchanged. These data demonstrate that the process of this invention provides a highly efficient means of removing sulfuric acid from admixtures with sulfonic acids. In addition, these data show that the quantity of sulfuric acid removed far exceeds that which would be expected purely on the basis of the ion exchange capacity of the resin since if the sulfuric acid is removed as the bisulfate ion, the ion exchange capacity is exceeded by approximately seven-fold, whereas, if it is assumed that the sulfuric acid is removed as the sulfate ion, the ion exchange capacity is exceeded by approximately fourteen-fold.

The above data were obtained by neutralizing the hexane solutions of sulfonic acids with an aqueous ethyl alcohol solution of sodium hydroxide and thereafter distilling off the hexane, water and alcohol leaving only the neutralized material. The amount of sodium sulfate was determined by the standard ASTM Method D–820–46. The quantity of sulfuric acid equivalent to the sodium sulfate was then calculated.

Example II

In Example I the various wash fractions of each cycle were analyzed for sulfuric acid content and the percentage of total sulfuric acid which had been removed from the sulfonic acid-sulfuric acid mixture was determined. The data from the five cycles were averaged and it was found that the hexane wash fraction, following the hexane sulfuric acid-sulfonic acid treating step contained 4.0 percent of the total sulfuric acid removed. The 50 percent aqueous alcohol solution wash contained 63.0 percent of the sulfuric acid. The water wash following the alcohol wash contained 28.5 percent of the total sulfuric acid, and the sodium hydroxide regeneration step removed the remaining 4.5 weight percent of the sulfuric acid. These data show that the polar solvents, i.e., aqueous alcohol and water, remove the sulfuric acid which is adsorbed on the resin while the sulfuric acid which was separated by ion exchange can be removed only by a regeneration treatment of the resin.

Example III

A portion of the hexane solution of the mixture of sulfuric acid and sulfonic acids of Example I was passed through a 100 cc. bed of Permutit S–1 anion exchange resin in the hydroxyl cycle. This resin had been treated with one volume (100 cc.) of a 50 percent aqueous methanol solution followed by two volumes (200 cc.) of hexane. After passing forty volumes (4 liters) of the hexane solution of sulfuric and sulfonic acids over the resin, this treatment was discontinued and two volumes of hexane followed by two volumes of 50 percent aqueous methanol solution and 30 volumes of water were passed over the resin. Two more cycles consisting of treatment of the resin with one volume of 50 percent aqueous methanol solution, two volumes of hexane, forty volumes of hexane-sulfuric acid-sulfonic acid solution, two volumes of hexane, two volumes of 50 percent aqueous methanol solution and thirty volumes of water were carried out. In the fourth cycle the resin was again treated with one volume of 50 percent aqueous methanol solution followed by two volumes of hexane and then with sixteen volumes of the hexane solution of sulfuric-sulfonic acids and an additional amount of the hexane solution of the sulfuric-sulfonic acids in the form of eleven 4-volume portions were passed over the resin making the total amount of hexane sulfonic acid solution treated equal to sixty volumes (6 liters). Each of the eleven 4-volume portions and the first 16-volume portion were analyzed for the sulfuric acid and sulfonic acid content. The sulfonic acid content was found to be unchanged, while the sulfuric acid content had been reduced to approximately 0.05 percent by weight. The amount of sulfuric acid removed per cycle was found to be essentially the same as that set forth in Example I less the ion exchange capacity of the resin.

Examples I and II demonstrate that sulfuric acid may be separated exceedingly efficiently from sulfuric acid-sulfonic acid mixtures contained in a non-polar solvent by the use of an anion exchange resin in the hydroxyl cycle. They also demonstrate that a portion of the sulfuric acid is separated by ion exchange and the remainder is separated by adsorption on the resin which has been converted to the sulfate cycle.

Example III demonstrates that the anion exchange resin in the sulfate cycle may be utilized exclusively in that form to separate sulfuric acid from sulfuric acid-sulfonic acid mixtures contained in a non-polar solvent. Although the anion exchange resin in Example III was converted to the sulfate cycle by contacting it with a sulfuric acid-sulfonic acid mixture, the resin may be converted to the sulfate cycle from the hydroxyl cycle, or other cycle such as the chloride form, by contacting the resin with a concentrated aqueous solution of an inorganic sulfate salt such as sodium sulfate, potassium sulfate, or the like. The resin now in the sulfate cycle is washed with demineralized water to remove inorganic ions and thereafter with the aqueous methanol and hexane as described to ready it for use.

Example IV

A 40-gram sample of a sulfonation mixture of an alkylated benzene hydrocarbon produced exactly as described in Example I, instead of being diluted with hexane was admixed with 160 grams of 50 percent aqueous methyl alcohol. This mixture contained 17.9 percent by weight sulfonic acids and 1.9 percent by weight sulfuric acid. This mixture was passed over 250 cc. of Amberlite IRA–400 anion exchange resin which had been regenerated with one liter of 5 percent sodium hydroxide, water washed to negative sodium content and then washed with 800 cc. of a 50 percent aqueous methanol solution identical with that used as the diluent for the sulfonic acid. After passing the sulfonic acid solution through the ion acid mixture to reduce the viscosity of the mixture and to make the first preliminary separation of sulfuric acid.

The non-polar solvents for the sulfuric acid-sulfonic acid mixtures which are suitable for the process of this invention are preferably hydrocarbons boiling below about 400° F. and preferably between the range of 100° F. to 400° F. Particularly suitable non-polar hydrocarbon solvents are benzene, toluene, xylene, ethyl benzene, propyl benzene, and cumene. In addition to these aromatic hydrocarbons or mixtures thereof, other suitable hydrocarbons include paraffinic solvents such as petroleum naphtha having an end point below 400° F., for example, naphtha boiling between about 175° F. and 225° F. A particularly suitable and preferred non-polar solvent is hexane.

Following the dilution of the sulfonation mixture with the non-polar solvent a phase separation occurs and a solvent layer containing the sulfonic acids together with small amounts of sulfuric acid and unreacted hydrocarbons from the sulfonation reaction is formed over the aqueous layer containing the major portion of the spent sulfuric acid from the sulfonation reaction. After the phases have stratified they are separated by decantation techniques. The upper non-polar solvent layer containing the small amount of sulfuric acid and the alkylated aryl sulfonic acids together with minor amounts of unreacted hydrocarbons is passed over the anion exchange bed in the hydroxyl cycle in the manner which has been described.

The effluent sulfonic acids contained in the non-polar solvent from which the sulfuric acid has been separated may be heated to distill off the non-polar solvent together with any small amounts of the aforementioned unreacted hydrocarbons to produce the purified sulfonic acids. The purified sulfonic acids may be neutralized directly according to any of the known procedures to produce the corresponding sulfonates such as the sodium, potassium, lithium, magnesium, calcium, or barium sulfonates.

Alternatively the sulfonic acid solution from the anion exchange bed may be mixed with an aqueous alcohol solution and a basic reagent. The basic reagent may be a strong base such as sodium or potassium hydroxide, preferably at least 25 percent concentration in water, or it may be an aqueous suspension of magnesium oxide or hydroxide or similar basic reagent in an amount sufficient to neutralize the sulfonic acid content of the non-polar solvent solution. In this latter procedure the alcohol may be methanol, ethanol, propanol, or isopropanol although methanol is preferred. Generally, about 4 volumes of 40 percent to 50 percent aqueous methanol based upon the original amount of alkylated aryl hydrocarbon, together with sufficient 25 percent sodium hydroxide, is suitable for effecting extraction and neutralization of the alkylated aryl sulfonic acids. In accordance with the prior art teachings in this respect, the concentration and amount of aqueous alcohol and of alkali solution must be carefully controlled to obtain clean separation. The presence of too much water causes emulsification difficulties, while too much alcohol prevents the separation of the sulfonates from the hydrocarbon solvent. From 2 to 5 volumes of 25 percent to 60 percent of aqueous alcohol based on the original alkylated hydrocarbon gives satisfactory extractions where the alkyl groups contain from 9 to 18 carbon atoms.

The amount of basic reagent should be sufficient to neutralize the sulfonic acids. Treatment with the alcohol-basic reagent produces two immiscible liquid phases, one comprising essentially the non-polar or hydrocarbon solvent with any minor amounts of unsulfonated alkylated aryl hydrocarbons, and the other comprising an aqueous alcohol solution of the sulfonates containing only minor amounts of hydrocarbon solvent and unsulfonated material. The aqueous alcohol phase after separation from the hydrocarbon phase again may be contacted with an additional quantity of fresh hydrocarbon solvent to remove any residual unsulfonated materials and after separation the aqueous alcohol solution of sulfonates may be heated to remove the alcohol, water, and traces of hydrocarbon solvent.

The sulfonates produced either by direct neutralization of the sulfonic acids, or as produced from the aqueous alcohol extraction method utilized to remove unsulfonated material, will be essentially free of inorganic salts, i.e., inorganic sulfates, since the sulfuric acid has been separated from the sulfonic acids prior to the neutralization by the described ion exchange method of this invention.

It is within the scope of this invention to contact a wide range of quantities of sulfuric acid-sulfonic acid mixtures with the anion exchange resin in the hydroxyl cycle. The upper extremity of the range is the quantity which will not only convert all of the ion exchange resin into the sulfate cycle but will also utilize substantially all of the adsorptive capacity of the sulfate form of the resin. Any quantity of sulfuric acid-sulfonic acid mixture less than this may be treated and it will be understood that with such quantities of the sulfuric acid-sulfonic acid mixture in a non-polar solvent, a portion of the sulfuric acid will be separated by ion exchange and a portion will be separated by adsorption on that quantity of resin which has been converted to the sulfate cycle. Accordingly the process is one of contacting the sulfuric acid-sulfonic acid mixture with an anion exchange resin in the hydroxyl cycle to convert at least a portion of the resin to the sulfate cycle, contacting additional quantities of the mixture with the resin until at least a portion of the adsorptive capacity of the resin in the sulfate cycle has been utilized and separating the sulfonic acids from the resin.

It is also within the scope of this invention to contact the sulfuric acid-sulfonic acid mixture with the anion exchange resin in the hydroxyl cycle, continuing the contacting until the resin has been converted to the sulfate cycle, and thereafter passing a polar solvent over the resin to remove any adsorbed sulfuric acid leaving the resin in the sulfate cycle. The resin in the sulfate cycle then may be used for the separation of sulfuric acid from the sulfonic acids by adsorption only. Stated in other words, the resin is not regenerated to the hydroxyl cycle but instead is only treated to desorb the sulfuric acid and left in the sulfate cycle and utilized in that form for subsequent separation of sulfuric acid from mixtures of sulfuric acid and sulfonic acids. When used in the sulfate cycle the quantity of mixture treated should not exceed that required to utilize completely the adsorptive capacity of the resin. If a quantity in excess of this limit is treated, sulfuric acid will appear in the effluent. Quantities less than this amount can, of course, be treated so that only a portion of the adsorptive capacity of the resin in the sulfate cycle is utilized.

The following examples are provided to illustrate certain specific embodiments of the invention. These examples, however, should not be construed to limiting the invention to the specific conditions set forth therein.

*Example I*

An alkylated benzene fraction wherein the alkyl group contained an average of 12 carbon atoms (total range 9 to 15 carbon atoms) was prepared by the aluminum chloride alkylation of benzene with a propylene polymer fraction having an average of 12 carbon atoms in the molecule.

This alkylated benzene fraction was sulfonated according to the usual commercial method employing approximately 100 percent sulfuric acid as the sulfonating agent at temperatures of about 150° F. The sulfonation mixture was air blown to remove sulfur dioxide and thereafter added to several volumes of hexane. Two layers exchange bed, the sulfuric acid content was found to be less than 0.1 percent by weight, however, the sulfonic acid content was found to be about only 7.5 percent by weight showing that a large percentage of the sulfonic acids had been retained on the resin so that the yield of sulfonic acids was only of the order of 42 percent based on the weight of sulfonic acids charged. These data demonstrate that whereas the sulfuric acid may be reacted with the ion exchange resin in the hydroxyl cycle when the sulfuric acid-sulfonic acid mixture is contained in a polar solvent, the sulfonic acids also react with the resin so that considerably more than half of the sulfonic acids are retained by the resin. These data also demonstrate that in order to separate the sulfuric acid selectively from the sulfonic acids it is necessary that the sulfuric acid-sulfonic acid mixture be contained in a non-polar solvent. Examples I, II, and III demonstrate that a polar solvent removes adsorbed sulfuric acid from the resin and accordingly the process of this invention is not operable for the separation of sulfuric acid from sulfuric acid-sulfonic acid mixtures contained in a polar solvent.

*Example V*

In order to demonstrate that the process of the instant invention may be operated with repeated cycles and with weakly basic anion resins, a hexane solution of sulfuric acid-sulfonic acids prepared in the manner described for Example I was contacted with a 1.3 gallons of a weakly basic anion exchange resin sold under the designation of Permutit CCG. This resin is furnished by the manufacturer in the hydroxyl form and has a particle size from 10 to 50 U.S. Standard Sieve Mesh. The resin was first washed with water, then with an approximately 50 volume percent aqueous methanol solution and finally with hexane in order to prepare the resin for use. A quantity of the hexane solution of the sulfuric acid-sulfonic acid mixture was passed over the resin following which the resin was successively treated by washing with hexane, washing with a 50 volume percent aqueous methanol solution, and washing with water. The resin after the water wash was regenerated with a 4 percent aqueous solution of sodium hydroxide, again washed with water, then with the 50 volume percent aqueous methanol solution and finally with hexane to complete the cycle. The resin was subjected to 15 such cycles, except that in a few of the cycles the sodium hydroxide regeneration step was omitted and the resin employed in the sulfate form in the next succeeding cycle. At the end of the 15th cycle the efficiency of the resin for removal of sulfuric acid from sulfuric acid-sulfonic acid mixtures appeared to be unchanged. The quantities of hexane solution of sulfuric acid-sulfonic acid mixture was varied from cycle to cycle and ranged up to 90 gallons. The amount of sulfuric acid removed was followed by determining the purity of the sulfonic acids produced. For example, in the ninth cycle which followed a regeneration cycle in which the resin was regenerated completely to the hydroxyl cycle, after 41 gallons of the hexane solution of the sulfuric acid-sulfonic acid mixture had been passed over the resin the concentration of sulfonic acids on the dry basis had decreased from 100 percent to 99.2 percent indicating that small amounts of sulfuric acid were beginning to appear in the product. After 85 gallons of the solution had been passed over the resin the dry "active" concentration had been reduced to 97.8 percent. By comparing the data obtained in these cycles it was determined that the volume of hexane solution of the sulfuric acid-sulfonic acid mixture which should be treated in each cycle to give substantially sulfuric acid-free sulfonic acids should be about 30 volumes of solution per volume of resin employed. It was also found from a comparison of cycles that when the resin was contacted initially in the hydroxyl cycle the amount of hexane solution of sulfuric acid sulfonic acids which could be treated was approximately 20 percent greater than when the resin was contacted initially in the sulfate cycle.

The quantities of non-polar and polar solvents employed for washing have not been found to be exceedingly critical, however, in general, at least one volume, based on the volume of the resin employed, of the non-polar solvent such as hexane should be used to wash the resin in order to remove occluded sulfonic acids in the first part of the cycle and one volume to displace the methanol solution when it is used at the end of the cycle. Similarly, one volume based on the volume of the resin of the polar solvent should be employed for washing in the first part of the cycle to displace the non-polar solvent and removed adsorbed sulfuric acid and one volume in the latter part of the cycle to displace the water from the bed. The volume of water utilized for washing following the aqueous methanol or similar polar solvent wash in the first part of the cycle should be at least one volume based on the volume of the resin and preferably 15 volumes or more in order to insure that all traces of the sulfuric acid have been desorbed from the resin. Similarly, the quantity of water used to wash the resin after the caustic regeneration step should be at least one volume based on the volume of the resin and preferably 10 volumes or more in order to insure that all of the caustic solution has been removed from the resin. Larger quantities of non-polar solvent and polar solvent washes may be employed as desired, however, the guide as to the quantity involved is simply that enough wash solvent should be utilized to accomplish the results desired and as dictated by the degree of contacting, shape of the bed and similar variables in order to prepare the resin for the next step in the cycle. Additional tests have demonstrated that various polar solvents such as those which have been enumerated may be employed and that in the case of mixtures of alcohol and water a 75 volume percent aqueous methanol solution may be utilized with the same efficiency as the 50 volume percent aqueous methanol solution.

We claim:

1. A method for the separation of sulfuric acid from mixtures of sulfuric acid with alkylated aryl sulfonic acids selected from the group consisting of the alkylated benzene sulfonic acids, the alkylated toluene sulfonic acids, the alkylated xylene sulfonic acids, and the alkylated naphthalene sulfonic acids wherein the alkyl group contains from 9 to 18 carbon atoms contained in a hydrocarbon solvent boiling below 400° F. which comprises contacting the sulfuric acid-alkylated aryl sulfonic acid mixture with an anion exchange resin in the hydroxyl cycle thereby converting at least a portion of the resin to the sulfate cycle, contacting additional quantities of the sulfuric acid-alkylated aryl sulfonic acid mixture with the anion exchange resin until at least a portion of the adsorptive capacity of the anion exchange resin in the sulfate cycle has been utilized and separating the anion exchange resin from the alkylated aryl sulfonic acids.

2. A method for the separation of sulfuric acid from mixtures of sulfuric acid with alkylated aryl sulfonic acids selected from the group consisting of the alkylated benzene sulfonic acids, the alkylated toluene sulfonic acids, the alkylated xylene sulfonic acids, and the alkylated naphthalene sulfonic acids wherein the alkyl group contains from 9 to 18 carbon atoms contained in a hydrocarbon solvent boiling below 400° F. which comprises contacting the sulfuric acid-alkylated aryl sulfonic acid mixture with an anion exchange resin in the hydroxyl cycle thereby converting at least a portion of the resin to the sulfate cycle, contacting additional quantities of the sulfuric acid-alkylated aryl sulfonic acid mixture with the anion exchange resin until at least a portion of the adsorptive capacity of the anion exchange resin in the sulfate cycle has been utilized, separating the anion exchange resin from the alkylated aryl sulfonic acids and contacting the anion exchange resin with an aqueous solvent to remove the adsorbed sulfuric acid and thereafter with an aqueous hydroxyl ion containing solution to convert the anion exchange resin to the hydroxyl cycle.

3. A method for the separation of sulfuric acid from admixture with alkylated aryl sulfonic acids contained in the sulfonation mixture obtained by intimately contacting an alkylated aryl hydrocarbon selected from the group consisting of the alkylated benzenes, the alkylated toluenes, the alkylated xylenes, and the alkylated naphthalenes wherein the alkyl group contains from 9 to 18 carbon atoms with sulfuric acid, which comprises diluting the sulfonation mixture with a hydrocarbon solvent boiling below 400° F. to dissolve the alkylated aryl sulfonic acids but not the spent sulfuric acid, separating the hydrocarbon solution of the sulfonic acids containing a minor portion of the spent sulfuric acid from the major portion of the spent sulfuric acid, contacting the hydrocarbon solution of sulfonic acids containing the minor portion of sulfuric acid with an anion exchange resin in the hydroxyl cycle thereby converting at least a portion of the resin to the sulfate cycle, contacting additional quantities of the hydrocarbon solution of the sulfonation acids containing the minor portion of sulfuric acid with the anion exchange resin until at least a portion of the adsorptive capacity of the anion exchange resin in the sulfate cycle has been utilized and separating the anion exchange resin from the sulfonic acids.

4. A method for the separation of sulfuric acid from admixture with alkylated aryl sulfonic acids contained in the sulfonation mixture obtained by intimately contacting an alkylated aryl hydrocarbon selected from the group consisting of the alkylated benzenes, the alkylated toluenes, the alkylated xylenes, and the alkylated naphthalenes wherein the alkyl group contains from 9 to 18 carbon atoms with sulfuric acid, which comprises diluting the sulfonation mixture with hexane to dissolve the alkylated aryl sulfonic acids but not the spent sulfuric acid, separating the hexane solution of the sulfonic acids containing a minor portion of the spent sulfuric acid from the major portion of the spent sulfuric acid, contacting the hexane solution of sulfonic acids containing the minor portion of sulfuric acid with an anion exchange resin in the hydroxyl cycle thereby converting at least a portion of the resin to the sulfate cycle, contacting additional quantities of the hexane solution of the sulfonic acids containing the minor portion of sulfuric acid with the anion exchange resin until at least a portion of the adsorptive capacity of the anion exchange resin in the sulfate cycle has been utilized and separating the anion exchange resin from the alkylated aryl sulfonic acids.

5. A method for producing an alkylated aryl sulfonate detergent from the sulfonation mixture obtained by intimately contacting an alkylated aryl hydrocarbon selected from the group consisting of the alkylated benzenes, the alkylated toluenes, the alkylated xylenes, and the alkylated naphthalenes wherein the alkyl group contains from 9 to 18 carbon atoms with sulfuric acid, which comprises diluting the sulfonate mixture with a hydrocarbon solvent boiling below 400° F. to dissolve the alkylated aryl sulfonic acids but not the spent sulfuric acid, separating the hydrocarbon solution of the sulfonic acids containing a minor portion of the spent sulfuric acid from the major portion of the spent sulfuric acid, contacting the hydrocarbon solution of sulfonic acids containing the minor portion of sulfuric acid with an anion exchange resin in the hydroxyl cycle thereby converting at least a portion of the resin to the sulfate cycle, contacting additional quantities of the hydrocarbon solution of the sulfonic acids containing the minor portion of sulfuric acid with the anion exchange resin until at least a portion of the adsorptive capacity of the anion exchange resin in the sulfate cycle has been utilized, separating the hydrocarbon solution of sulfonic acids from the anion exchange resin, separating the hydrocarbon solvent from the sulfonic acids, and neutralizing the sulfonic acids to produce the sulfonate.

6. A method for producing an alkylated aryl sulfonate detergent from the sulfonation mixture obtained by intimately contacting an alkylated aryl hydrocarbon selected from the group consisting of the alkylated benzenes, the alkylated toluenes, the alkylated xylenes, and the alkylated napthalenes wherein the alkyl group contains from 9 to 18 carbon atoms with sulfuric acid, which comprises diluting the sulfonation mixture with hexane to dissolve the alkylated aryl sulfonic acids but not the spent sulfuric acid, separating the hexane solution of the sulfonic acids containing a minor portion of the spent sulfuric acid from the major portion of the spent sulfuric acid, contacting the hexane solution of sulfonic acids containing the minor portion of sulfuric acid with an anion exchange resin in the hydroxyl cycle thereby converting at least a portion of the resin to the sulfate cycle, contacting additional quantities of the hexane solution of sulfonic acids containing the minor portion of sulfuric acid with the anion exchange resin until at least a portion of the adsorptive capacity of the anion exchange resin in the sulfate cycle has been utilized, separating the hexane solution of sulfuric acids from the anion exchange resin, intimately contacting the hexane solution selected from the group consisting of methanol, ethanol, propanol, and isopropanol solutions of sulfonic acids with an aqueous alcohol solution of a sufficient amount of a basic reagent to neutralize the mixture, forming two immiscible liquid phases, one consisting essentially of hexane and minor amounts of unsulfonated alkylated aryl hydrocarbon, and the other consisting essentially of an aqueous alcohol solution of sulfonates containing minor amounts of hexane and unsulfonated alkylated aryl hydrocarbon, separating the immiscible phases from one another, intimately contacting the aqueous alcoholic solution comprising the second phase with an additional quantity of hexane, forming two immiscible liquid phases, one consisting essentially of hexane and residual unsulfonated alkylated aryl hydrocarbon and the other consisting essentially of an aqueous alcohol solution of sulfonates, separating the phases from one another, and heating the aqueous alcohol solution of sulfonates to remove alcohol and water.

7. A method for the separation of sulfuric acid from mixtures of sulfuric acid with alkylated aryl sulfonic acids selected from the group consisting of the alkylated benzene sulfonic acids, the alkylated toluene sulfonic acids, the alkylated xylene sulfonic acids, and the alkylated naphthalene sulfonic acids wherein the alkyl group contains from 9 to 18 carbon atoms contained in a hydrocarbon solvent boiling below 400° F. which comprises contacting the sulfuric acid-alkylated aryl sulfonic acid mixture with an anion exchange resin in the sulfate cycle and thereafter separating the anion exchange resin from the alkylated aryl sulfonic acids.

8. A method for the separation of sulfuric acid from mixtures of sulfuric acid from alkylated aryl sulfonic acids selected from the group consisting of the alkylated benzene sulfonic acids, the alkylated toluene sulfonic acids, the alkylated xylene sulfonic acids, and the alkylated naphthalene sulfonic acids wherein the alkyl group contains from 9 to 18 carbon atoms contained in a hydrocarbon solvent boiling below 400° F. which comprises contacting the sulfuric acid-alkylated aryl sulfonic acid mixture with an anion exchange resin in the sulfate cycle, separating the anion exchange resin from the alkylated aryl sulfonic acids and contacting the anion exchange resin with an aqueous solvent to remove the adsorbed sulfuric acid.

References Cited in the file of this patent

Nachod et al., "Ion Exchange Technology" (1956), pages 256–257.

UNITED STATES PATENT OFFICE
CERTIFICATE OF CORRECTION

Patent No. 3,030,411            April 17, 1962

Leonard N. Leum et al.

It is hereby certified that error appears in the above numbered patent requiring correction and that the said Letters Patent should read as corrected below.

Column 3, line 71, for "preferably" read -- preferable --; column 5, lines 19 and 20, for "hydracarbons" read -- hydrocarbons --; column 7, lines 26 and 27, after "sulfonic", each occurrence, insert -- acid --; column 12, line 8, for "napthalenes" read -- naphthalenes --; lines 25 to 27, strike out "selected from the group consisting of methanol, ethanol, propanol, and isopropanol solutions" and insert the same after "solution" in line 28, same column 12.

Signed and sealed this 28th day of August 1962.

(SEAL)
Attest:

ESTON G. JOHNSON
Attesting Officer

DAVID L. LADD
Commissioner of Patents